(12) United States Patent
Lu (10) Patent No.: US 8,769,322 B2
(45) Date of Patent: Jul. 1, 2014

(54) METHOD FOR ADJUSTING CLOCK FREQUENCY OF A PROCESSING UNIT OF A COMPUTER SYSTEM AND RELATED DEVICE

(75) Inventor: Kuo-Cheng Lu, Hsinchu (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 550 days.

(21) Appl. No.: 13/171,461

(22) Filed: Jun. 29, 2011

(65) Prior Publication Data

US 2012/0166861 A1 Jun. 28, 2012

(30) Foreign Application Priority Data

Dec. 28, 2010 (TW) ............................... 99146232 A (51) Int. Cl.
*G06F 1/00* (2006.01)

(52) U.S. Cl.
USPC ............................ 713/322; 713/300; 713/320

(58) Field of Classification Search
CPC ....... G06F 1/32; G06F 1/3203; G06F 1/3215; G06F 1/3234; G06F 1/324; G06F 1/3243; Y02B 60/10; Y02B 60/12; Y02B 60/1232; Y02B 60/1221; Y02B 60/1207; Y02B 60/1217
USPC ........................................ 713/300, 320, 322
See application file for complete search history.

(56) References Cited

U.S. PATENT DOCUMENTS

| 7,536,567 | B2 * | 5/2009 | Bonola et al. ................. 713/300 |
| 7,895,455 | B2 * | 2/2011 | Green et al. ................... 713/300 |
| 8,108,702 | B2 * | 1/2012 | Yoshida et al. ............... 713/320 |
| 8,166,322 | B2 * | 4/2012 | Kawashima et al. ......... 713/322 |
| 2005/0216607 | A1 | 9/2005 | Munguia |
| 2006/0212247 | A1 | 9/2006 | Shimoyama |
| 2008/0094108 | A1 | 4/2008 | Leon |
| 2010/0023790 | A1 * | 1/2010 | Cooper et al. ................ 713/322 |
| 2010/0094572 | A1 * | 4/2010 | Chase et al. .................... 702/57 |
| 2012/0233488 | A1 * | 9/2012 | Burchard et al. ............. 713/500 |

FOREIGN PATENT DOCUMENTS

TW 200426557 12/2004

* cited by examiner

*Primary Examiner* — Jaweed A Abbaszadeh
(74) *Attorney, Agent, or Firm* — Winston Hsu; Scott Margo (57) ABSTRACT

A method for adjusting clock frequency of a processing unit of a computer system includes calculating a busyness ratio of the processing unit according to a status signal provided by the processing unit, determining whether the busyness ratio is in a busyness ratio range, when the busyness ratio is not in the busyness ratio range, determining whether a calculation result generated according to a clock frequency of the processing unit and a frequency difference is in a frequency range, and when the calculation result is in the frequency range, adjusting the clock frequency of the processing unit according to the calculation result and outputting the adjusted clock frequency to a clock generator, wherein the busyness ratio range, the frequency range and the frequency difference are decided according to an operation state of a peripheral unit of the computer system.

20 Claims, 6 Drawing Sheets

METHOD FOR ADJUSTING CLOCK FREQUENCY OF A PROCESSING UNIT OF A COMPUTER SYSTEM AND RELATED DEVICE

BACKGROUND OF THE INVENTION

1. Field of the Invention

The present invention relates to a method for adjusting clock frequency of a processing unit of a computer system and related device, and more particularly, to a method for adjusting clock frequency of a central processing unit of a computer system to reduce peak power consumption of the computer system and related device.

2. Description of the Prior Art

A portable computer system, such as a laptop, a mobile phone or a portable wireless access point, uses a battery as a main power source. To improve power consumption efficiency, conventional power saving technologies such as clock gating and dynamic voltage and frequency scaling (DVFS) are widely used in various kinds of computer systems. Clock gating is using logic gates to control a clock circuit of a computer system to turn off operation of parts of the clock circuit when they are not necessary, for reducing power consumption. Dynamic voltage and frequency scaling is to estimate loading of a central processing unit (CPU) of a computer system by detecting changes of related signals to adjust the clock frequency and the operating voltage of the CPU accordingly, for reducing power consumption. Note that, these conventional power saving technologies aims to reduce average power consumption, especially when the computer system is in an idle/standby state.

The ideal battery capacity is normally measured under specific ideal conditions. However, in reality, the total battery power used by the computer system depends on many factors such as discharge current, temperature, humidity, etc, and may not be equal to the ideal battery capacity. For example, a battery of the rated capacity 1000 mAH can be continuously discharged for two hours by a discharge current 0.5 C (500 mA) to output a total power approximate to 100% battery capacity; however, the same battery can merely be discharged for less than one hour by a discharge current 1 C (1000 mA) to output a total power approximate to 80% battery capacity at most. When a battery is discharged or charged by a large current for a long time, the battery capacity is not able to be sufficiently utilized, and moreover, battery life will be reduced.

Figure 1:
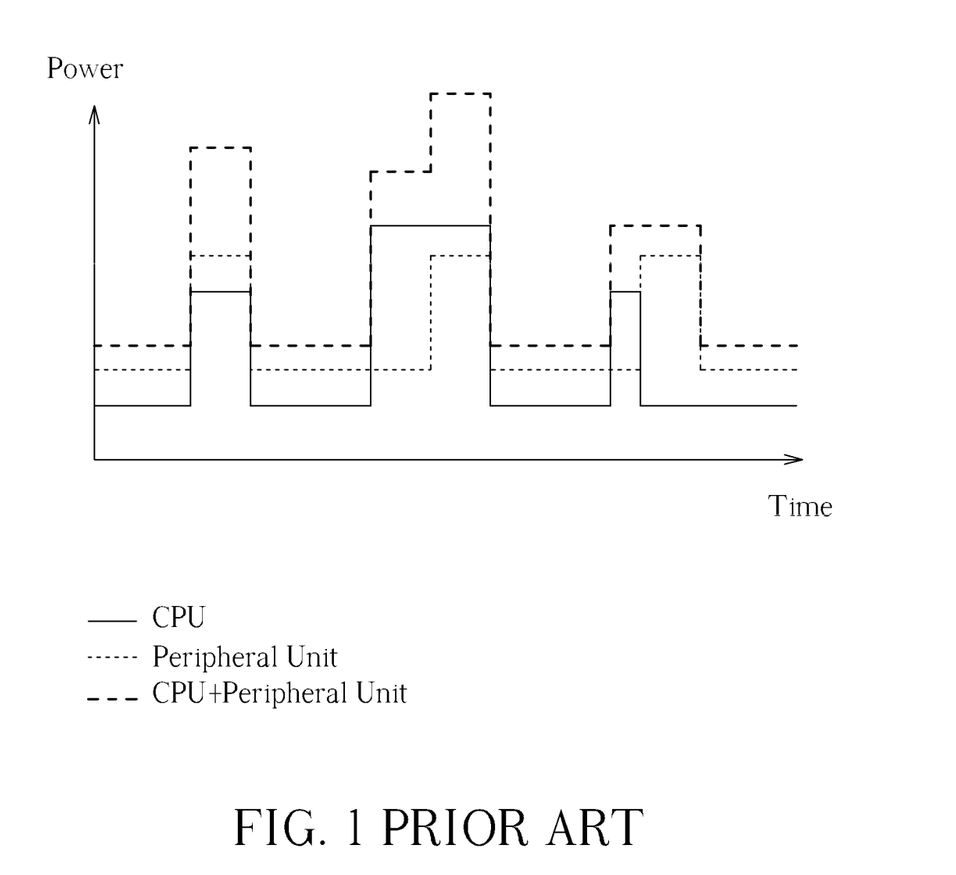
FIG. 1 is a timing diagram of power consumption of a computer system according to the prior art.

FIG. 1 is a timing diagram of power consumption of a conventional computer system, in which the computer system includes at least a central processing unit (CPU) and a peripheral unit. FIG. 1 illustrates that the total power consumption of the computer system (depicted in a bold dashed line) approximates to the sum of power consumption of the CPU (depicted in a solid line) and power consumption of the peripheral unit (depicted in a normal dashed line). As shown in FIG. 1, average power consumption of the CPU or the peripheral unit is normal in most of time; however, peak power consumption of the CPU and peak power consumption of the peripheral unit take place at almost the same time. At that time, peak power consumption of the computer system is quite large and a battery of the computer system is discharged by a huge current, and as a result, the total usable battery power and even the battery life may be decreased.

It is inevitable that usable battery power or battery life is decreased since the conventional power saving technologies can only reduce average power consumption and cannot effectively reduce peak power consumption of each unit on the computer system. Therefore, to use battery power efficiently and maintain battery life as long as possible is important for a portable computer system.

SUMMARY OF THE INVENTION

It is therefore a primary objective of the claimed invention to provide a method for adjusting clock frequency of a processing unit of a computer system and related device.

The present invention discloses a method for adjusting clock frequency of a processing unit of a computer system further comprising a peripheral unit. The method comprises calculating a busyness ratio of the processing unit according to a status signal provided by the processing unit, determining whether the busyness ratio is in a busyness ratio range, when the busyness ratio is not in the busyness ratio range, determining whether a calculation result generated according to a clock frequency of the processing unit and a frequency difference is in a frequency range, and when the calculation result is in the frequency range, adjusting the clock frequency of the processing unit according to the calculation result and outputting the adjusted clock frequency to a clock generator of the computer system. The busyness ratio range, the frequency range and the frequency difference are decided according to the operation of the peripheral unit.

The present invention further discloses a clock frequency setting device for a processing unit of a computer system, which comprises a frequency adjustment device and a parameter setting device. The frequency adjustment device is coupled to the processing unit and a clock generator of the computer system, for periodically performing a clock frequency adjustment process. The parameter setting device is coupled to a peripheral unit of the computer system and the frequency adjustment device, for receiving a clock frequency fed back from the frequency adjustment device and generating a plurality of frequency adjustment parameters outputted to the frequency adjustment device. The parameter setting device comprises a first register for storing the plurality of frequency adjustment parameters which are used when the peripheral unit is in an idle state, a second register for storing the plurality of frequency adjustment parameters which are used when the peripheral unit is in a busy state, a demultiplexing unit coupled to the peripheral unit, the first register and the second register, for selectively outputting the clock frequency to the first register or the second register according to a status signal generated by the peripheral unit, and a multiplexing unit coupled to the peripheral unit, the first register and the second register, for selectively outputting of the plurality of frequency adjustment parameters stored in the first register or the plurality of frequency adjustment parameters stored in the second register to the frequency adjustment device according to the status signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
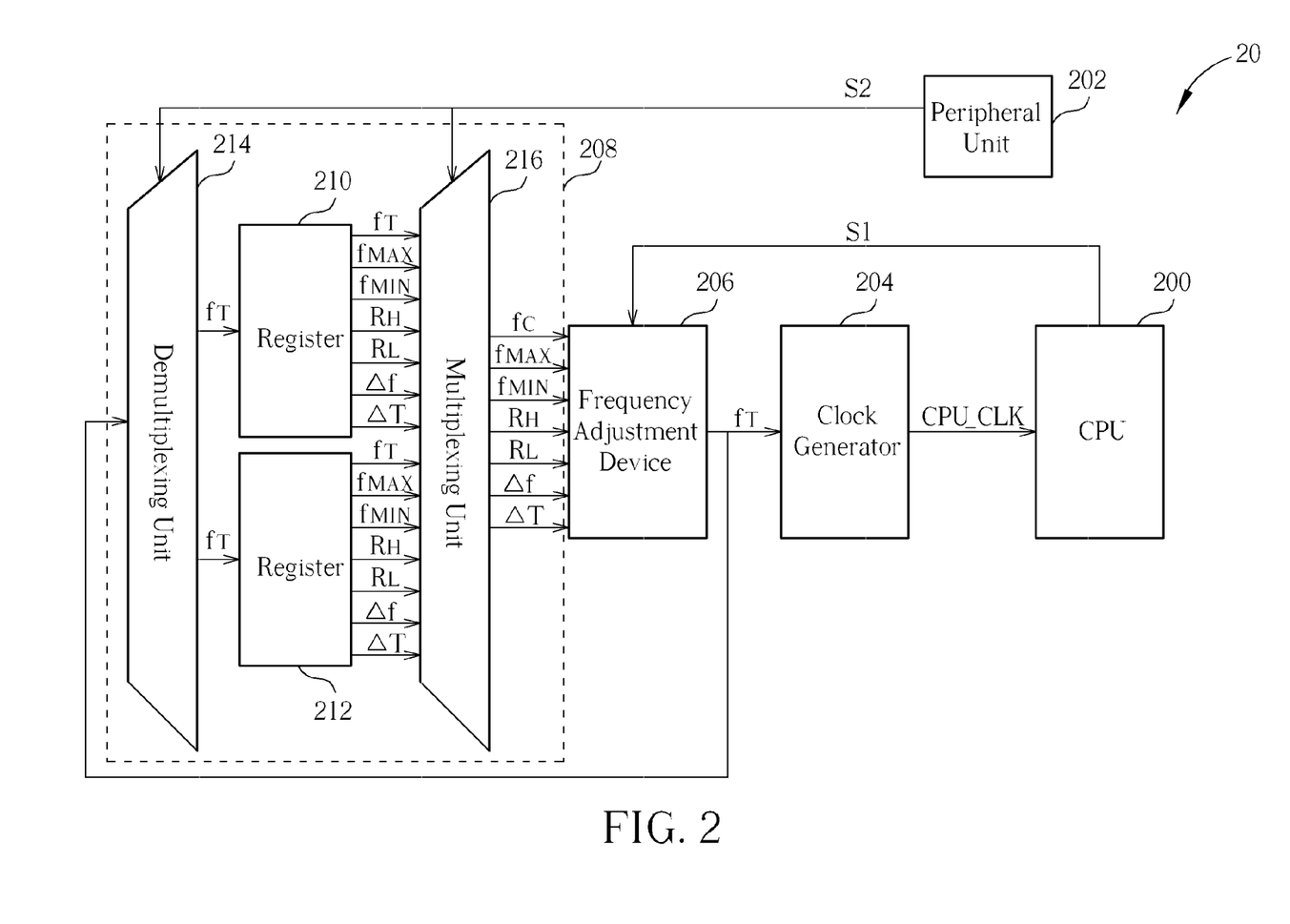
FIG. 2 is a schematic diagram of a computer system according to an embodiment of the present invention.

Please refer to FIG. 2, which is a schematic diagram of a computer system 20 according to an embodiment of the present invention. The computer system 20 uses a battery as a main power source and can be a laptop, a mobile phone, a portable wireless access point, etc. The computer system 20 comprises a central processing unit (CPU) 200, a peripheral unit 202, a clock generator 204, a frequency adjustment device 206 and a parameter setting device 208.

The CPU 200 is the core unit of the computer system 20 and is coupled to the clock generator 204. The CPU 200 uses a clock CPU_CLK generated by the clock generator 204 for executing commands and operations. The CPU 200 is able to generate a status signal S1 indicating that the CPU 200 is in a sleep state or a wake-up state by a relative high or low voltage level. Therefore, the busyness ratio of the CPU 200 is a ratio of the time period during which the status signal S1 is in a high or low voltage level in a given time. In general, there is a sleep signal set in a CPU to control the CPU to enter a sleep state or wake up the CPU to work, and in the embodiment of the present invention, this sleep signal is used as the status signal S1.

Like the CPU 200, the peripheral unit 202 also consumes large power in the computer system 20. For instance, if the computer system 20 is a laptop, the peripheral unit 202 can be a digital signal processor (DSP) or a wireless communication module, e.g. a Bluetooth module or a wireless local area network (WLAN) module; and if the computer system 20 is a wireless access point, the peripheral unit 202 can be a WLAN module or a Ethernet module. The peripheral unit 202 can generate a status signal S2 indicating that the peripheral unit 202 is in an idle state or a busy state. For example, the value of the status signal S2 may be 0 or 1, respectively representing the idle state or the busy state. The peripheral unit 202 in the idle state consumes tiny average power; however, the peripheral unit 202 in the busy state has large average power consumption and peak power consumption frequently appears. Note that, how to determine the peripheral unit 202 is in the idle state or the busy state is not limited; for example, it can be done by detecting the duty cycle of a specific signal of the peripheral unit 202, or by detecting current consumption of the peripheral unit 202.

In FIG. 2, the computer system 20 includes only one peripheral unit, which aims to illustrate the concept of the present invention, and in fact a general computer system can include several peripheral units. It is easy for those skilled to take a group of peripheral units (except the CPU) as the peripheral unit 202 of FIG. 2. For example, the computer system 20 may include N peripheral units and each peripheral unit is relative to a weighting factor. Each peripheral unit may generate a status signal and this status signal controls a multiplexer to selectively output the corresponding weighting factor, which can be equal to or larger than zero. All the weighting factors outputted by N multiplexers are summed up and then compared with a threshold value by a comparator. Finally, the signal outputted by the comparator indicates the status of a group of the N peripheral units, which is used as the status signal S2 of the peripheral unit 202.

The circuit of the frequency adjustment device 206 and the parameter setting device 208 is operated as a clock frequency setting device for setting a CPU clock frequency, and thus the clock generator 204 generates the clock CPU_CLK according to the CPU clock frequency.

The frequency adjustment device 206 is coupled to the CPU 200, the clock generator 204 and the parameter setting device 208, and is utilized for performing a frequency adjustment process to adjust a current CPU clock frequency $f_C$ according to the status signal S1 and several frequency adjustment parameters outputted from the parameter setting device 208. The current CPU clock frequency $f_C$ is adjusted to be a CPU clock frequency $f_T$, and CPU clock frequency $f_T$ is outputted to the clock generator 204 and also fed back via the parameter setting device 208 as a next CPU clock frequency $f_C$ for performing the next frequency adjustment process. Frequency adjustment parameters provided by the parameter setting device 208 include an upper bound $f_{MAX}$ and a lower bound $f_{MIN}$ of a CPU clock frequency range, an upper bound $R_H$ and a lower bound $R_L$ of a CPU busyness ratio range, a frequency difference $\Delta f$, and a period $\Delta T$.

Figure 3:
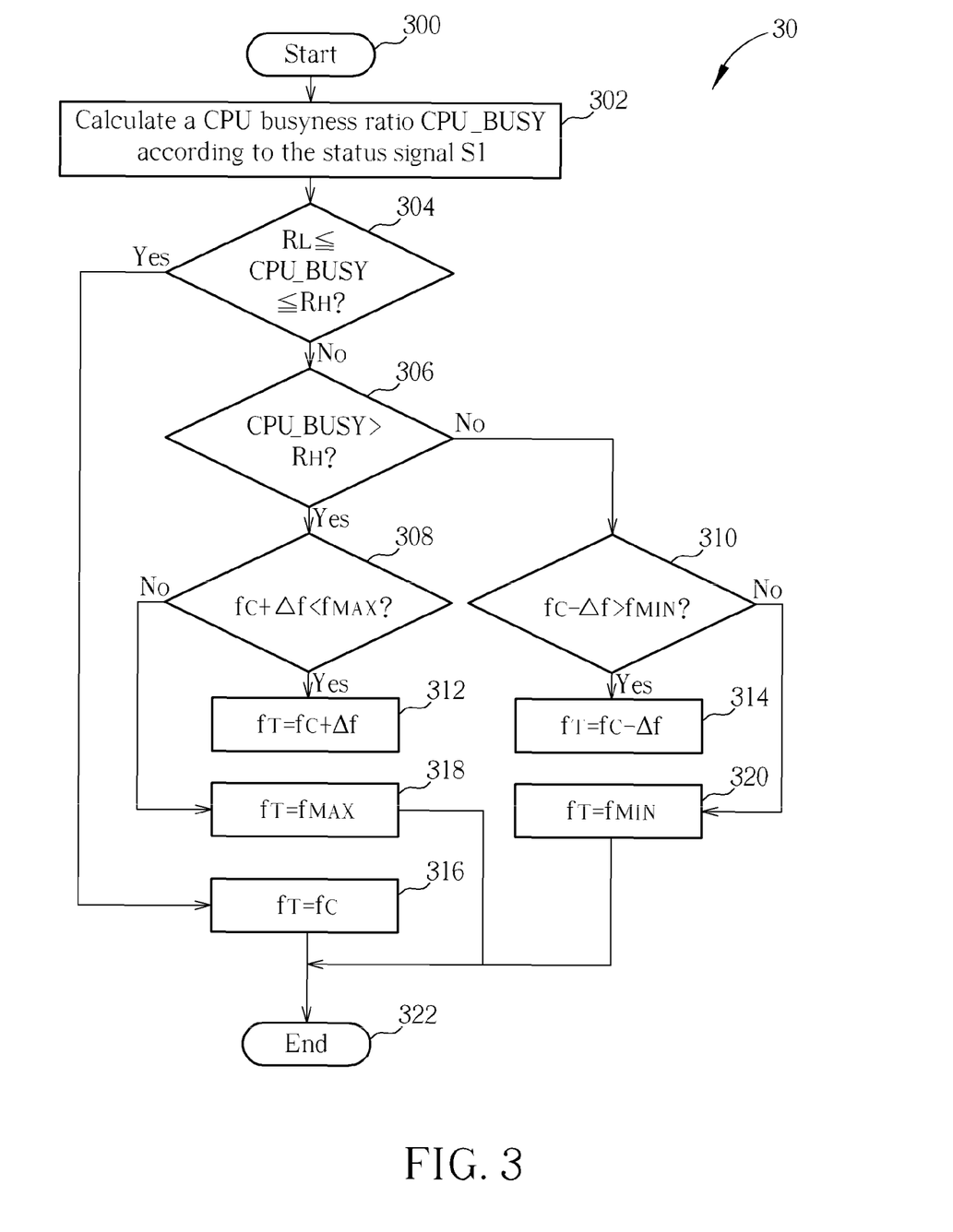
FIG. 3 is a flowchart of a process according to an embodiment of the present invention.

Please refer to FIG. 3, which is a flowchart of a process 30 according to an embodiment of the present invention. The process 30 is the frequency adjustment process performed by the frequency adjustment device 206, including the following steps:

Step 300: Start.

Step 302: Calculate a CPU busyness ratio CPU_BUSY according to the status signal S1 provided by the CPU 200.

Step 304: Determine whether the CPU busyness ratio CPU_BUSY is in the CPU busyness ratio range, $R_L \leq$ CPU_BUSY $\leq R_H$. If yes, perform Step 316; else, perform Step 306.

Step 306: Determine whether the CPU busyness ratio CPU_BUSY is larger than the upper bound $R_H$. If yes, perform Step 308; else, perform Step 310.

Step 308: Determine whether a calculation result of the CPU clock frequency $f_C$ plus the frequency difference $\Delta f$ is smaller than the upper bound $f_{MAX}$. If yes, perform Step 312; else, perform Step 318.

Step 310: Determine whether a calculation result the CPU clock frequency $f_C$ minus the frequency difference $\Delta f$ is larger than the lower bound $f_{MIN}$. If yes, perform Step 314; else, perform Step 320.

Step 312: Output CPU clock frequency $f_T = f_C + \Delta f$ to the clock generator 204.

Step 314: Output CPU clock frequency $f_T = f_C - \Delta f$ to the clock generator 204.

Step 316: Output CPU clock frequency $f_T = f_C$ to the clock generator 204.

Step 318: Output CPU clock frequency $f_T = f_{MAX}$ to the clock generator 204.

Step 320: Output CPU clock frequency $f_T = f_{MIN}$ to the clock generator 204.

Step 322: End.

The frequency adjustment device 206 periodically performs the process 30 according to the period $\Delta T$ provided by the parameter setting device 208. According to Step 302, the frequency adjustment device 206 calculates a CPU busyness ratio CPU_BUSY according to the status signal S1 provided by the CPU 200, i.e. calculates the ratio of a total time in a given period during which the status signal S1 is in a high (or low) voltage level to the given period. When the status signal S1 is a sleep signal commonly used in a general CPU, the status signal S1 in a high voltage level is related to a sleep sate and the status signal S1 in a low voltage level is related to a wake-up state, and therefore the CPU busyness ratio CPU_BUSY is equal to the ratio of a total time when the status signal S1 is in the low voltage level to a given period.

According to Step 304, the frequency adjustment device 206 determines whether the CPU busyness ratio CPU_BUSY is in the CPU busyness ratio range $R_L$-$R_H$. That is, the frequency adjustment device 206 determines whether the CPU 200 can afford current loading and is not too busy or free. When the frequency adjustment device 206 recognizes that CPU_BUSY is in the CPU busyness ratio range $R_L$-$R_H$, which indicates that the CPU clock frequency $f_C$ is high enough to handle current CPU loading, according to Step 316, the frequency adjustment device 206 does not adjust the CPU clock frequency $f_C$ and outputs the CPU clock frequency $f_T$ equal to $f_C$ to the clock generator 204.

When the frequency adjustment device 206 recognizes that CPU_BUSY is not in the CPU busyness ratio range $R_L$-$R_H$, i.e. CPU_BUSY>$R_H$ or CPU_BUSY<$R_L$, according to Step 306, the frequency adjustment device 206 further determines whether CPU_BUSY is larger than $R_H$. When the frequency adjustment device 206 recognizes that CPU_BUSY is larger than $R_H$, which indicates that the CPU 200 is not able to handle the overloading well by the current CPU clock frequency $f_C$, according to Step 308, the frequency adjustment device 206 further determines whether the calculation result of the CPU clock frequency $f_C$ plus the frequency difference $\Delta f$ is smaller than the upper bound $f_{MAX}$ of the CPU clock frequency range, i.e. to determine if there is room to increase the CPU clock frequency. When the calculation result $f_C+\Delta f$ is smaller than $f_{MAX}$, according to Step 312, the frequency adjustment device 206 increases the CPU clock frequency from $f_C$ to $f_C+\Delta f$ and outputs the CPU clock frequency $f_T=f_C+\Delta f$ to the clock generator 204. Otherwise, when the frequency adjustment device 206 recognizes that the calculation result $f_C+\Delta f$ is equal to or larger than $f_{MAX}$, according to Step 318, the frequency adjustment device 206 outputs the CPU clock frequency $f_T=f_{MAX}$ to the clock generator 204, i.e. to increase the CPU clock frequency up to $f_{MAX}$.

When the frequency adjustment device 206 recognizes that CPU_BUSY is smaller than $R_L$, which indicates that the CPU 200 has a light loading and the used CPU clock frequency is not necessary to be such a high frequency, according to Step 310, the frequency adjustment device 206 further determines whether the calculation result of the CPU clock frequency $f_C$ minus the frequency difference $\Delta f$ is larger than the lower bound $f_{MIN}$ of the CPU clock frequency range, i.e. to determine if there is room to decrease the CPU clock frequency. When the calculation result $f_C-\Delta f$ is larger than $f_{MIN}$, according to Step 314, the frequency adjustment device 206 decreases the CPU clock frequency from $f_C$ to $f_C-\Delta f$ and outputs the CPU clock frequency $f_T=f_C-\Delta f$ to the clock generator 204. Otherwise, when the frequency adjustment device 206 recognizes that the calculation result $f_C-\Delta f$ is equal to or smaller than $f_{MIN}$, according to Step 320, the frequency adjustment device 206 outputs the CPU clock frequency $f_T=f_{MIN}$ to the clock generator 204, i.e. to decrease the CPU clock frequency down to $f_{MIN}$.

In another embodiment, when the calculation result $f_C+\Delta f$ is equal to or larger than the upper bound $f_{MAX}$ or when the calculation result $f_C-\Delta f$ is equal to or smaller than the lower bound $f_{MIN}$, the frequency adjustment device 206 does not adjust the CPU clock frequency and outputs the CPU clock frequency $f_T=f_C$.

By the process 30, the frequency adjustment device 206 is able to increase the CPU clock frequency as much as possible when the CPU 200 is overloading and is able to decrease the CPU clock frequency but also maintain an acceptable efficiency when the CPU 200 has a light loading. Thus, the CPU 200 can operate by a proper CPU clock frequency and reduce average power consumption through the frequency adjustment device 206 and the process 30.

Figure 4:
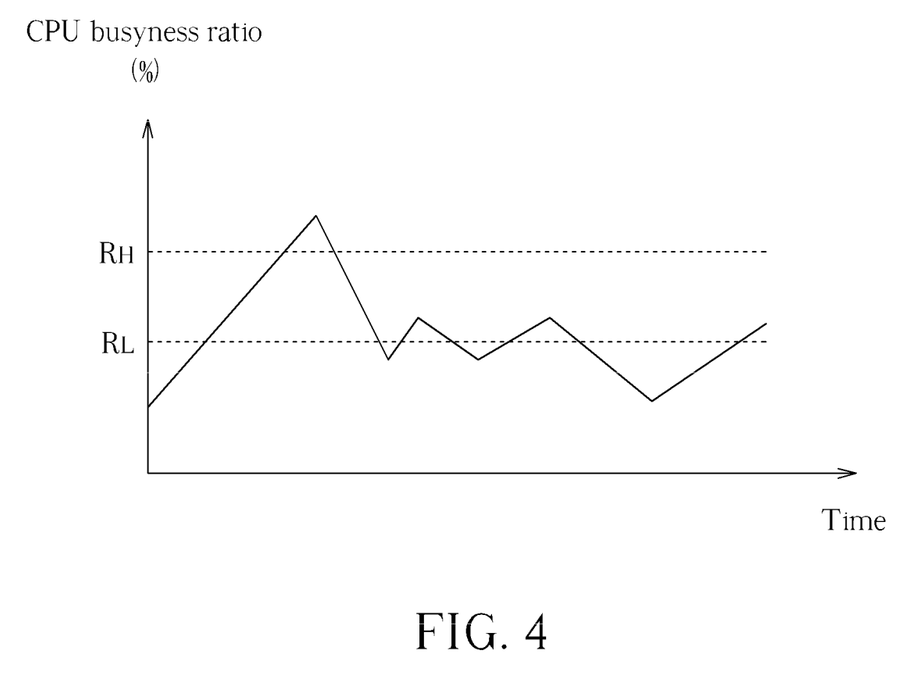
FIG. 4 is a curve of the CPU busyness ratio versus time.

Please refer to FIG. 4, which is a curve of the CPU busyness ratio versus time, calculated by the frequency adjustment device 206. As a result of the process 30, when the CPU busyness ratio CPU_BUSY is larger than the upper bound $R_H$, the frequency adjustment device 206 increases the CPU clock frequency to handle the heavy loading, so that the CPU busyness ratio increases restrictedly. When the CPU busyness ratio is larger than the upper bound $R_H$, the frequency adjustment device 206 increases the CPU clock frequency to handle the loading on the CPU 200, thus the CPU busyness ratio decreases. On the other side, when the CPU busyness ratio is smaller than the lower bound $R_L$, the frequency adjustment device 206 decreases the CPU clock frequency for saving power consumption; in this situation, the CPU busyness ratio increases again and back to be in the range of $R_L$-$R_H$.

Please note that the frequency adjustment device 206 is operated according to the process 30 and those skilled can implement the detail circuitry of the frequency adjustment device 206 according to the process 30. For instance, the CPU busyness ratio CPU_BUSY can be generated by using a counter or timer, which detects the duty cycle of the status signal S1; determination steps of the process 30 can be realized by using a comparator or similar logic components; or, frequency increasing/decreasing steps can be realized by using an adder. The sleep signal already existed in the CPU 200 can be used as the status signal S1 for calculating the CPU busyness ratio, and therefore no more additional hardware cost (e.g. one more pinout) on the CPU 200.

In the process 30, the frequency adjustment device 206 applies the same frequency difference to increase and decrease the CPU clock frequency. In another embodiment, when the CPU 200 is a higher level CPU and can handle higher complexity, the frequency difference used for increasing and decreasing the CPU clock frequency can be different values. For example, the frequency difference for decreasing the CPU clock frequency may be smaller than that for increasing the CPU clock frequency.

As mentioned previously, the parameters used by the frequency adjustment device 206, including the upper bound $f_{MAX}$ and the lower bound $f_{MIN}$ of CPU clock frequency range, the upper bound $R_H$ and the lower bound $R_L$ of CPU busyness ratio range, the frequency difference $\Delta f$, and the period $\Delta T$, are provided by the parameter setting device 208, which is detailed illustrated in FIG. 2. The parameter setting device 208 includes the registers 210 and 212, a demultiplexing unit 214, and a multiplexing unit 216.

The register 210 is utilized for storing values of the frequency adjustment parameters used by the frequency adjustment device 206 when the peripheral unit 202 is in the idle state, and the register 212 is utilized for storing the frequency adjustment parameters used by the frequency adjustment device 206 when the peripheral unit 202 is in the busy state. The frequency adjustment parameters are $f_{MAX}$, $f_{MIN}$, $R_H$, $R_L$, $\Delta f$ and $\Delta T$, and the value of each parameter used when the peripheral unit 202 is in the idle state can be different from or the same as that used when the peripheral unit 202 is in the busy state.

The demultiplexing unit 214 is coupled to the peripheral unit 202, the frequency adjustment device 206, and the registers 210 and 212. The demultiplexing unit 214 is utilized for selectively outputting the clock frequency $f_T$ (fed back from the frequency adjustment device 206) to the register 210 or the register 212 according to the status signal S2. When the value of the status signal S2 is 0, which indicates that the peripheral unit 202 is in the idle state, the demultiplexing unit 214 outputs the CPU clock frequency $f_T$ to the register 210; otherwise, when the value of the status signal S2 is 1, which indicates that the peripheral unit 202 is in the busy state, the demultiplexing unit 214 outputs the CPU clock frequency $f_T$ to the register 212.

The multiplexing unit 216 is coupled to the peripheral unit 202, the frequency adjustment device 206, and the registers 210 and 212. The multiplexing unit 216 is utilized for selectively outputting values of the frequency adjustment parameters stored in the register 210 or stored in the register 212 to the frequency adjustment device 206 according to the status signal S2. When the value of the status signal S2 is 0, the multiplexing unit 216 outputs the values of the frequency adjustment parameters stored in the register 210 to the frequency adjustment device 206; and when the value of the status signal S2 is 1, the multiplexing unit 216 outputs the values of the frequency adjustment parameters stored in the register 212 to the frequency adjustment device 206.

The aforementioned process and devices realize the essential idea of the present invention that is to use different values of the frequency adjustment parameters according to different operation states of the peripheral unit 202, which achieves that not only the busyness of the CPU 200 but also the operation states of the peripheral unit 202 are taken into account, when the CPU clock frequency is required to be adjusted. Therefore, when the peripheral unit 202 is in the busy state, the CPU clock frequency is not increased too much.

In one embodiment, the acceptable CPU clock frequency range $f_{MIN}$-$f_{MAX}$ used when the peripheral unit 202 is in the idle state and in the busy state can be respectively defined as 100-400 MHz and 50-250 MHz, for example. Based on the predefined CPU clock frequency range, when the peripheral unit 202 is in the busy state, the maximum CPU clock frequency is only 250 MHz, not 400 MHz, thus the probability of that peak power consumption of the CPU 200 and peak power consumption of the peripheral unit 202 are overlapping in time is considerably reduced. In another embodiment, the frequency difference $\Delta f$ used when the peripheral unit 202 is in the idle state and in the busy state can be respectively defined as 50 MHz and 10 MHz, for example. Based on the predefined frequency difference, when the peripheral unit 202 is in the busy state, the CPU clock frequency is increased slowly (since 10 MHz is smaller than 50 MHz) and the probability of that peak power consumption of the CPU 200 and peak power consumption of the peripheral unit 202 are overlapping in time is also reduced.

Figure 5:
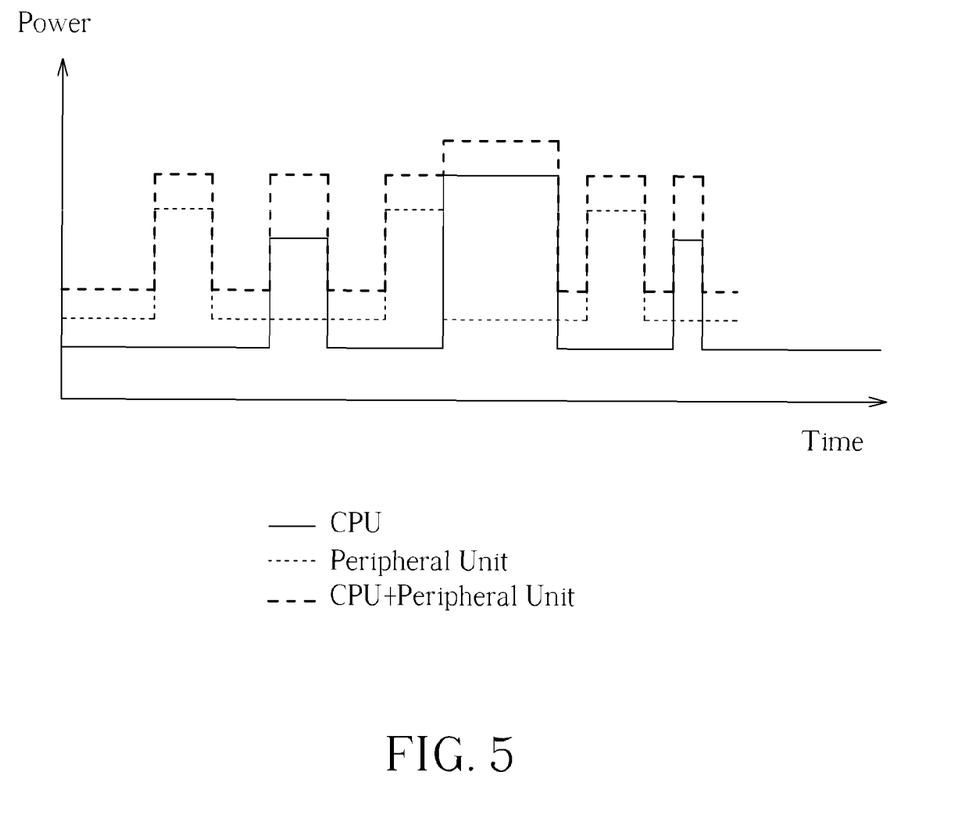
FIG. 5 is a timing diagram of power consumption of the computer system of FIG. 2.

Please refer to FIG. 5, which is a timing diagram of power consumption of the computer system 20 of FIG. 2, in which power consumption of the CPU 200, power consumption of the peripheral unit 202 and the total power consumption of the computer system 20 are respectively depicted in a solid line, a normal dashed line, and a bold dashed line. Compared to FIG. 1, the probability of that peak power consumption of the CPU 200 and peak power consumption of the peripheral unit 202 are overlapping in time is obviously reduced. Consequently, the time for discharging the battery of the computer system 20 by a large current (caused by the large peak power consumption) is decreased. This is helpful to the battery because the usable battery power and battery life are prevented from being decreased.

Figure 6:
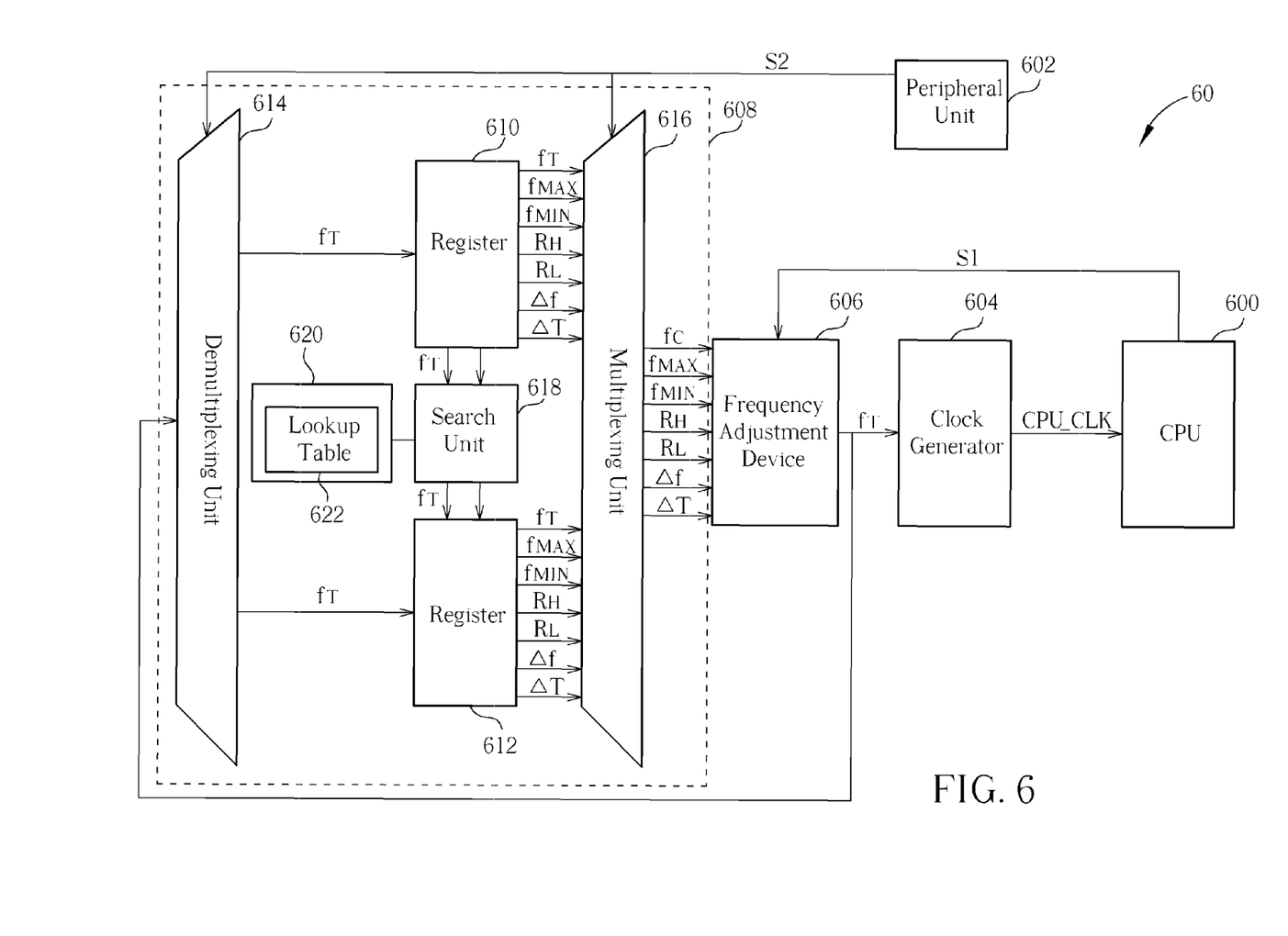
FIG. 6 is a schematic diagram of a computer system according to an embodiment of the present invention.

Please refer to FIG. 6, which is a schematic diagram of a computer system 60 according to an embodiment of the present invention. The computer system 60 is similar to the computer system 20 of FIG. 2 and comprises a CPU 600, a peripheral unit 602, a clock generator 604, a frequency adjustment device 606, and a parameter setting device 608. The frequency adjustment device 606 can also be operated according to the process 30 of FIG. 3. The parameter setting device 608 includes registers 610 and 612, a demultiplexing unit 614, a multiplexing unit 616, a search unit 618, and a register 620. The registers 610 and 612 are respectively utilized for storing values of the frequency adjustment parameters used when the peripheral unit 602 is in the idle state and in the busy state.

Please note that, the differences between the computer system 60 and the computer system 20 are the search unit 618 and the register 620. The register 620 is utilized for storing a lookup table 622 recording several CPU clock frequency ranges and corresponding values of frequency adjustment parameters. The frequency adjustment parameters may include the frequency difference $\Delta f$, the period $\Delta T$, the upper bound $f_{MAX}$ and the lower bound $f_{MIN}$ of the CPU clock frequency range, and so on. The search unit 618 is coupled to the registers 610, 612 and 620, and is utilized for searching a corresponding clock frequency range which the clock frequency stored in the register 610 is in and thereby searching corresponding values of the frequency adjustment parameters accordingly from the lookup table 622, and outputting the searched values of the frequency adjustment parameters to the register 612.

In other words, the values of the frequency adjustment parameters stored in the register 610 are fixed values, and a part of values of the frequency adjustment parameters stored in the register 612 are acquired by searching the lookup table 622, which are not fixed values and can be changed according the CPU clock frequency stored in the register 610. That is, the frequency adjustment parameters used when the peripheral unit 602 is in the busy state are decided according to the CPU clock frequency used when the peripheral unit 602 is in the idle state.

Please note that, to decide the values of the frequency adjustment parameters according to the CPU clock frequency used when the peripheral unit 602 is in the idle state is the essential idea of the present invention, which achieves that even though the peripheral unit 602 enters the busy state and the CPU clock frequency needs to be decreased, how much the CPU clock frequency should be decreased is decided based on the loading of the CPU 600 by the frequency adjustment device 606. Therefore, the efficiency of the CPU 600 does not drop too much.

The frequency adjustment device 606 may operate in different ways according to the frequency adjustment parameters recorded in the lookup table 622. For instance, in one embodiment, the frequency difference $\Delta f$ stored in the register 610 can be a fixed value, 50 MHz, and CPU clock frequency ranges and corresponding frequency differences recorded in the lookup table 622 can be 0-99 MHz corresponding to $\Delta f=10$ MHz, 100-299 MHz corresponding to $\Delta f=20$ MHz, and 300-400 MHz corresponding to $\Delta f=30$ MHz.

Based on the above assumption, when the peripheral unit 602 is in the idle state, the frequency adjustment device 606 uses $\Delta f=50$ MHz to adjust the CPU clock frequency. When the peripheral unit 602 leaves the idle state and enters the busy state and the current CPU clock frequency is 300 MHz, the search unit 618 finds out the frequency difference $\Delta f=30$ MHz (corresponding to 300-400 MHz where 300 MHz is in) from the lookup table 622 and outputs $\Delta f=30$ MHz to the register 612, and the multiplexing unit 616 can select $\Delta f=30$ MHz from the register 612 to output to the frequency adjustment device 606. The frequency difference $\Delta f$ used when the peripheral unit 602 is in the busy state (30 MHz) is smaller than that used when the peripheral unit 602 is in the idle state (50 MHz), which means that the increase of CPU clock frequency is suppressed. Therefore, the probability that peak power consumption of the CPU 600 and the peripheral unit 602 are overlapping in time is reduced. Furthermore, when the peripheral unit 602 is in the busy state and the CPU clock frequency is decreased to be 50 MHz, the search unit 618 finds out the frequency difference $\Delta f=10$ MHz (corresponding to 0-99 MHz where 50 MHz is in) to be used by the frequency adjustment device 606. Since 10 MHz is the minimum frequency difference, the frequency adjustment device 606 can use this frequency difference to increase the CPU clock frequency when the loading of the CPU 600 is getting heavy and also prevents the CPU clock frequency from being increased too fast.

In another embodiment, when the peripheral unit 602 is in the busy state and the current CPU clock frequency is in 300-400 MHz which is the highest range, the frequency difference $\Delta f$ used by the frequency adjustment device 606 may be restricted to be equal to the frequency difference used when the peripheral unit 602 is in the idle state, such as 50 MHz in the abovementioned embodiment. As a result, when the peripheral unit 602 enters the busy state under a condition that the CPU 600 is very busy and the CPU clock frequency is high, the CPU clock frequency can be maintained in an acceptable range and is not decreased too much.

In another embodiment, the lookup table 622 records CPU clock frequency ranges and corresponding clock adjustment periods $\Delta T$ instead of the frequency differences; the higher CPU clock frequency range is corresponding to a smaller clock adjustment period. In this condition, the frequency difference stored in the register 612 can be a fixed value.

As a result, when the peripheral unit 602 is in the busy state and the CPU clock frequency is adjusted to be a lower frequency, which indicates that the loading of the CPU 600 is not heavy, the frequency adjustment device 606 uses a larger clock adjustment period $\Delta T$ in the next frequency adjustment to suppress the CPU clock frequency increasing rate and thereby reduces the probability of peak power consumption overlapping. On the contrast, when the CPU clock frequency is adjusted to be a higher frequency, which indicates that the loading of the CPU 600 increases, the frequency adjustment device 606 uses a smaller clock adjustment period $\Delta T$ in the next frequency adjustment to speed up the CPU clock frequency increasing rate, for maintaining the efficiency of the CPU 600.

In another embodiment, the lookup table 622 can record CPU clock frequency ranges which are used for determining which range the current clock frequency is in and corresponding CPU clock frequency ranges $f_{MIN}$-$f_{MAX}$ used for frequency adjustment; the higher CPU clock frequency range is corresponding to a lower CPU clock frequency range $f_{MIN}$-$f_{MAX}$. In this condition, the frequency difference $\Delta f$ and the period $\Delta T$ stored in the register 612 can be fixed values. As a result, when the peripheral unit 602 is in the busy state and the CPU clock frequency is adjusted to be a lower frequency, the frequency adjustment device 606 can use a lower CPU clock frequency range $f_{MIN}$-$f_{MAX}$ in the next frequency adjustment, i.e. a limited upper bound that the CPU clock frequency can be adjusted up to. On the contrast, when the CPU clock frequency is adjusted to be a higher frequency, the frequency adjustment device 606 uses a higher CPU clock frequency range $f_{MIN}$-$f_{MAX}$ in the next frequency adjustment, i.e. gives a higher upper bound that the CPU clock frequency can be adjusted up to, which indirectly maintains the efficiency of the CPU 600.

In another embodiment, when the peripheral unit 602 is in the busy state and the current CPU clock frequency is in the highest CPU clock frequency range, the corresponding upper bound $f_{MAX}$ of the CPU clock frequency range may be set to be the acceptable maximum CPU clock frequency, or be set to be the CPU clock frequency used when the peripheral unit 602 right enters the busy state, so that the CPU clock frequency of the CPU 600 can maintain and would not damage its efficiency even when the peripheral unit 602 enters into busy state right from the idle state while the CPU 600 is busy.

According to the abovementioned embodiments, the frequency adjustment device can use different and fixed values of frequency adjustment parameters when the peripheral unit is in the idle state and in the busy state. Or, by using a lookup table, when the peripheral unit is in the busy state, the frequency adjustment parameters are generated according to the CPU clock frequency used when the peripheral unit is in the idle state. Please note that, the abovementioned are exemplary embodiments of the present invention, and those skilled in the art can make alterations and modifications accordingly. For example, in the computer system 20 (or the computer system 60), the frequency adjustment device 206 not only feedbacks the adjusted CPU clock frequency to the parameter setting device 208 but also feedbacks the CPU busyness ratio to the registers 210 and 212. Thus, in the next frequency adjustment, the frequency adjustment device 206 calculates the moving average or weighted average of the previous CPU busyness ratio received from the register 210 or 212 and a newly generated CPU busyness ratio, and obtains a final CPU busyness ratio used for determining whether to adjust the CPU clock frequency.

In FIG. 2, the value of the status signal S2 generated by the peripheral unit 202 is 0 or 1 respectively indicating two operation states of the peripheral unit 202, including the idle state and the busy state. In another embodiment, the status signal S2 can be a digital signal indicating more than two operation states; in this situation, the number of the demultiplexing units, the multiplexing units and the registers can be defined based on the requirement, which is well known to those skilled in the art.

In conclusion, the frequency adjustment device according to the present invention uses different values of frequency adjustment parameters to adjust the CPU clock frequency according to the operation state of the peripheral unit of the computer system, and preferably, when the peripheral unit is in the busy state, the frequency adjustment parameters are decided according to the CPU clock frequency used when the peripheral unit is in the idle state. Thus, the frequency adjustment device can decrease the CPU clock frequency properly according to the loading of the CPU even when the peripheral unit is in the busy state. The embodiments of the present invention not only decrease average power consumption of the computer system but also prevent the battery of the computer system from being discharged by the huge current caused by peak power overlapping, so as to extend the battery life as much as possible and at the same time maintain efficiency of the CPU.

Those skilled in the art will readily observe that numerous modifications and alterations of the device and method may be made while retaining the teachings of the invention.

What is claimed is:

1. A method for adjusting clock frequency of a processing unit of a computer system, wherein the computer system further comprises a peripheral unit, the method comprising:

calculating a busyness ratio of the processing unit according to a status signal provided by the processing unit;

determining whether the busyness ratio is in a busyness ratio range;

when the busyness ratio is not in the busyness ratio range, determining whether a calculation result generated according to a clock frequency of the processing unit and a frequency difference is in a frequency range; and when the calculation result is in the frequency range, adjusting the clock frequency of the processing unit according to the calculation result and outputting the adjusted clock frequency to a clock generator of the computer system, wherein the busyness ratio range, the frequency range and the frequency difference are decided according to the operation of the peripheral unit.

2. The method of claim 1, wherein the status signal is utilized for indicating that the processing unit is in a sleep state or a wake-up state.

3. The method of claim 1, wherein when the peripheral unit is in a busy state, the frequency difference for generating the calculation result is decided according to the clock frequency of the processing unit used when the peripheral unit is in an idle state.

4. The method of claim 1, wherein when the peripheral unit is in a busy state, the frequency range for determining the calculation result is decided according to the clock frequency of the processing unit used when the peripheral unit is in an idle state.

5. The method of claim 1, wherein the computer system performs the method for adjusting clock frequency periodically by a predefined period, and when the peripheral unit is in a busy state, the predefined period is decided according to the clock frequency of the processing unit used when the peripheral unit is in an idle state.

6. The method of claim 1, wherein the step of determining whether the calculation result is in the frequency range when the busyness ratio is not in the busyness ratio range comprises:

when the busyness ratio is larger than an upper bound of the busyness ratio range, determining whether the calculation result which is equal to the clock frequency plus the frequency difference is smaller than an upper bound of the frequency range.

7. The method of claim 1, wherein the step of determining whether the calculation result is in the frequency range when the busyness ratio is not in the busyness ratio range comprises:

when the busyness ratio is smaller than a lower bound of the busyness ratio range, determining whether the calculation result which is equal to the clock frequency minus the frequency difference is larger than a lower bound of frequency range.

8. The method of claim 1 further comprising:
when the calculation result is larger than an upper bound of the frequency range, increasing the clock frequency to be equal to the upper bound of the frequency range.

9. The method of claim 1 further comprising:
when the calculation result is smaller than a lower bound of the frequency range, decreasing the clock frequency to be equal to the lower bound of the frequency range.

10. A clock frequency setting device for a processing unit of a computer system, comprising:

a frequency adjustment device coupled to the processing unit and a clock generator of the computer system, for periodically performing a clock frequency adjustment process; and a parameter setting device coupled to a peripheral unit of the computer system and the frequency adjustment device, for receiving a clock frequency fed back from the frequency adjustment device and generating a plurality of frequency adjustment parameters outputted to the frequency adjustment device, the parameter setting device comprising:

a first register for storing the frequency adjustment parameters used when the peripheral unit is in an idle state;

a second register for storing the frequency adjustment parameters used when the peripheral unit is in a busy state;

a demultiplexing unit coupled to the peripheral unit, the first register and the second register, for selectively outputting the clock frequency to the first register or the second register according to a status signal generated by the peripheral unit; and a multiplexing unit coupled to the peripheral unit, the first register and the second register, for selectively outputting the frequency adjustment parameters stored in the first register or the frequency adjustment parameters stored in the second register to the frequency adjustment device according to the status signal.

11. The clock frequency setting device of claim 10 further comprising:

a third register for storing a lookup table recording a plurality of clock frequency ranges and the corresponding frequency adjustment parameters; and a search unit coupled to the first register, the second register and the third register, for searching for a clock frequency range stored in the first register and the corresponding frequency adjustment parameters from the lookup table, and outputting the found frequency adjustment parameter to the second register.

12. The clock frequency setting device of claim 10, wherein the clock frequency adjustment process comprises the following steps:

calculating a busyness ratio of the processing unit according to a status signal provided by the processing unit;

determining whether the busyness ratio is in a busyness ratio range;

when the busyness ratio is not in the busyness ratio range, determining whether a calculation result generated according to the clock frequency of the processing unit and a frequency difference is in a frequency range; and when the calculation result is in the frequency range, adjusting the clock frequency of the processing unit according to the calculation result and outputting the adjusted clock frequency to the clock generator, wherein the busyness ratio range, the frequency range, the frequency difference, and a predefined period of the clock frequency adjustment process are included in the frequency adjustment parameters.

13. The clock frequency setting device of claim 12, wherein the status signal provided by the processing unit is utilized for indicating that the processing unit is in a sleep state or a wake-up state.

14. The clock frequency setting device of claim 12, wherein when the peripheral unit is in a busy state, the frequency difference for generating the calculation result is decided according to the clock frequency of the processing unit used when the peripheral unit is in an idle state.

15. The clock frequency setting device of claim 12, wherein when the peripheral unit is in a busy state, the frequency range for determining the calculation result is decided according to the clock frequency of the processing unit used when the peripheral unit is in an idle state.

16. The clock frequency setting device of claim 12, wherein when the peripheral unit is in a busy state, the predefined period is decided according to the clock frequency of the processing unit used when the peripheral unit is in an idle state.

17. The clock frequency setting device of claim 12, wherein the step of determining whether the calculation result is in the frequency range when the busyness ratio is not in the busyness ratio range comprises:
  when the busyness ratio is larger than an upper bound of the busyness ratio range, determining whether the calculation result which is equal to the clock frequency plus the frequency difference is smaller than an upper bound of the frequency range.

18. The clock frequency setting device of claim 12, wherein the step of determining whether the calculation result is in the frequency range when the busyness ratio is not in the busyness ratio range comprises:
  when the busyness ratio is smaller than a lower bound of the busyness ratio range, determining whether the calculation result which is equal to the clock frequency minus the frequency difference is larger than a lower bound of frequency range.

19. The clock frequency setting device of claim 12 further comprising:
  when the calculation result is larger than an upper bound of the frequency range, increasing the clock frequency to be equal to the upper bound of the frequency range.

20. The clock frequency setting device of claim 12 further comprising:
  when the calculation result is smaller than a lower bound of the frequency range, decreasing the clock frequency to be equal to the lower bound of the frequency range.

* * * * *